(12) United States Patent
Bunker et al.

(10) Patent No.: US 9,206,696 B2
(45) Date of Patent: Dec. 8, 2015

(54) COMPONENTS WITH COOLING CHANNELS AND METHODS OF MANUFACTURE

(75) Inventors: Ronald Scott Bunker, Waterford, NY (US); Eric Richard Bonini, Greer, SC (US)

(73) Assignee: General Electric Company, Niskayuna, NY (US)

( * ) Notice: Subject to any disclaimer, the term of this patent is extended or adjusted under 35 U.S.C. 154(b) by 1081 days.

(21) Appl. No.: 13/210,697

(22) Filed: Aug. 16, 2011

(65) Prior Publication Data

US 2013/0043009 A1    Feb. 21, 2013

(51) Int. Cl.
*F28F 13/06* (2006.01)
*F01D 5/18* (2006.01)
*B23K 26/38* (2014.01)

(52) U.S. Cl.
CPC ............... *F01D 5/187* (2013.01); *B23K 26/38* (2013.01); *B23K 26/383* (2013.01); *B23K 26/388* (2013.01); *F01D 5/183* (2013.01);
(Continued)

(58) Field of Classification Search
CPC ..... F01D 5/187; F01D 5/183; F05D 2230/90; F05D 2260/204; F05D 2250/292; B23K 26/38; B23K 26/388; B23K 26/383; Y10T 29/4932; Y10T 29/49341; Y02T 50/672; Y02T 50/676
USPC ............ 29/889.1, 889.2, 889.7, 889.72, 29/889.721; 416/97 R; 165/168
See application file for complete search history.

(56) References Cited

U.S. PATENT DOCUMENTS 4,604,031 A * 8/1986 Moss et al. ............... 416/97 R
4,992,025 A * 2/1991 Stroud et al. ............. 416/97 R
(Continued)

FOREIGN PATENT DOCUMENTS

EP    1387040 B1    4/2004

OTHER PUBLICATIONS

D.G. Hyams et al., "A Detailed Analysis of film Cooling Physics: Part III—Streamwise Injection With Shaped Holes," Journal of Turbomachinery, vol. 122, Issue 1, Jan. 2000, pp. 122-132.
(Continued)

*Primary Examiner* — Ryan J Walters
(74) *Attorney, Agent, or Firm* — Ann M. Agosti

(57) ABSTRACT

A component is provided and includes a substrate comprising an outer and an inner surface, where the inner surface defines at least one hollow, interior space. The component defines one or more grooves, where each groove extends at least partially along the outer surface of the substrate and has a base and a top. The base is wider than the top, such that each groove comprises a re-entrant shaped groove. One or more access holes are formed through the base of a respective groove, to connect the groove in fluid communication with the respective hollow interior space. Each access hole has an exit diameter D that exceeds the opening width d of the top of the respective groove. The diameter D is an effective diameter based on the area enclosed. The component further includes at least one coating disposed over at least a portion of the surface of the substrate, wherein the groove(s) and the coating together define one or more re-entrant shaped channels for cooling the component. A method for manufacturing the component is also provided. A method for manufacturing a component is also provided, where the groove and the access hole(s) are machined as a single continuous process, such that the groove and the access hole(s) form a continuous cooling passage.

22 Claims, 8 Drawing Sheets

(52) U.S. Cl.
CPC ....... *F05D2230/90* (2013.01); *F05D 2250/292* (2013.01); *F05D 2260/204* (2013.01); *Y02T 50/672* (2013.01); *Y02T 50/676* (2013.01); *Y10T 29/4932* (2015.01); *Y10T 29/49341* (2015.01)

(56) References Cited

U.S. PATENT DOCUMENTS

| | | | |
|---|---|---|---|
| 5,313,038 A * | 5/1994 | Kildea | 219/69.17 |
| 5,626,462 A | 5/1997 | Jackson et al. | |
| 5,640,767 A | 6/1997 | Jackson et al. | |
| 5,875,549 A | 3/1999 | McKinley | |
| 6,214,248 B1 | 4/2001 | Browning et al. | |
| 6,234,755 B1 | 5/2001 | Bunker et al. | |
| 6,321,449 B2 | 11/2001 | Zhao et al. | |
| 6,368,060 B1 | 4/2002 | Fehrenbach et al. | |
| 6,383,602 B1 | 5/2002 | Fric et al. | |
| 6,412,541 B2 | 7/2002 | Roesler et al. | |
| 6,551,061 B2 | 4/2003 | Darolia et al. | |
| 6,582,194 B1 | 6/2003 | Birkner et al. | |
| 6,602,053 B2 | 8/2003 | Subramanian et al. | |
| 6,617,003 B1 | 9/2003 | Lee et al. | |
| 6,905,302 B2 | 6/2005 | Lee et al. | |
| 6,921,014 B2 | 7/2005 | Hasz et al. | |
| 6,994,521 B2 * | 2/2006 | Liang | 416/97 R |
| 7,014,923 B2 | 3/2006 | Schnell et al. | |
| 7,094,475 B2 | 8/2006 | Schnell et al. | |
| 7,186,167 B2 | 3/2007 | Joslin | |
| 7,302,990 B2 | 12/2007 | Bunker et al. | |
| 7,744,348 B2 | 6/2010 | Bezencon et al. | |
| 7,766,617 B1 | 8/2010 | Liang | |
| 7,775,768 B2 | 8/2010 | Devore et al. | |
| 8,591,191 B1 * | 11/2013 | Liang | 416/97 R |
| 2004/0265488 A1 * | 12/2004 | Hardwicke et al. | 427/180 |
| 2006/0099080 A1 | 5/2006 | Lee et al. | |
| 2010/0080688 A1 | 4/2010 | Bezencon et al. | |

OTHER PUBLICATIONS

B. Wei et al., "Curved Electrode and Electrochemical Machining Method and Assembly Employing the Same," U.S. Appl. No. 12/562,528, filed Sep. 18, 2009.

W. Zhang et al., Process and System for Forming Shaped Air Holes, U.S. Appl. No. 12/697,005, filed Jan. 29, 2010.

B.P. Lacy et al., "Hot Gas Path Component Cooling System," U.S. Appl. No. 12/765,372, filed Apr. 22, 2010.

B. Lacy et a., "Articles Which Include Chevron Film Cooling Holes, and Related Processes," U.S. Appl. No. 12/790,675, filed May 28, 2010.

J.E.J. Lambie et al., "An overview on micro-meso manufacturing techniques for micro-heat exchangers for turbine blade cooling," International Journal Manufacturing Research, vol. 3, No. 1, 2008, pp. 3-26.

R.S. Bunker et al., "Components With Re-Entrant Shaped Cooling Channels and Methods of Manufacture," U.S. Appl. No. 12/943,624, filed Nov. 10, 2010.

R.S. Bunker et al., "Component and Methods of Fabricating and Coating a Component," U.S. Appl. No. 12/943,646, filed Nov. 10, 2010.

R.S.Bunker et al., "Method of Fabricating a Component Using a Fugitive Coating," U.S. Appl. No. 12/943,563, filed Nov. 10, 2010.

R.S. Bunker et al., "Components With Cooling Channels and Methods of Manufacture," U.S. Appl. No. 12/965,083, filed Dec. 10, 2010.

R. S. Bunker et al., "Method of Fabricating a Component Using a Two-Layer Structural Coating," U.S. Appl. No. 12/996,101, filed Dec. 13, 2010.

R.S. Bunker et al., "Turbine Components With Cooling Features and Methods of Manufacturing the Same," U.S. Appl. No. 12/953,177, filed Nov. 23, 2010.

R.S. Bunker, "Components With Cooling Channels and Methods of Manufacture," U.S. Appl. No. 13/026,595, filed Feb. 14, 2011.

R. Rebak et al., "Methods of Fabricating a Coated Component Using Multiple Types of Fillers," U.S. Appl. No. 13/083,701, filed Apr. 11, 2011.

R. Bunker et al., "Components With Cooling Channels Formed in Coating and Methods of Manufacture", U.S. Appl. No. 13/052,415, filed Mar. 21, 2011.

R.B. Rebak et al., "Component and Methods of Fabricating a Coated Component Using Multiple Types of Fillers," U.S. Appl. No. 13/095,129, filed Apr. 27, 2011.

R. Bunker, "Components With Cooling Channels and Methods of Manufacture", U.S. Appl. No. 13/168,144, filed Jun. 24, 2011.

Unofficial English Translation of Chinese Office Action issued in connection with corresponding CN Application No. 201210291835.8 on Jun. 3, 2015.

* cited by examiner

COMPONENTS WITH COOLING CHANNELS AND METHODS OF MANUFACTURE

BACKGROUND

The invention relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy typically results in comparatively low heat transfer rates and non-uniform component temperature profiles.

Micro-channel cooling has the potential to significantly reduce cooling requirements by placing the cooling as close as possible to the heated region, thus reducing the temperature difference between the hot side and cold side of the main load bearing substrate material for a given heat transfer rate. Current techniques for forming micro-channel cooled components typically require the formation of access holes for the micro-channels using line-of-sight processing. In addition, current techniques for forming access holes through the top opening of a micro-channel are typically suitable for drilling an access hole with an effective exit diameter (based on the area enclosed) equal to or less than that of the top opening size of the channel. That is, for current machining techniques, one dimension of the tool must typically be less than the opening width, and this sets an upper limit on the size of access hole the tool can machine in that same dimension or direction.

Moreover, conventional machining methods break up the formation of multiply featured requirements into distinct and separate operations, often using differing machine tools. For example, micro-channel cooling passages may be made by milling the channels, followed by down-hole drilling of the access holes, then followed by shaping of the channel exits. Typically a different tool head would be used in each operation, which would involve re-positioning the tool or part, and would also create some transition or discontinuity in the resulting channels and holes. For flow passages such as micro-cooling of turbine parts, these discontinuities and start-stops are undesirable, leading to material flaws and dimensional changes.

It would therefore be desirable to provide improved methods for machining cooling channels and their associated access holes and channel exits. It would further be desirable to provide methods for forming a larger sized access hole through an existing restricted entry surface.

BRIEF DESCRIPTION

One aspect of the present invention resides in a component comprising a substrate having an outer surface and an inner surface, where the inner surface defines at least one hollow, interior space. The component defines one or more grooves, where each groove extends at least partially along the substrate and has a base and a top. The base is wider than the top, such that each groove comprises a re-entrant shaped groove. One or more access holes are formed through the base of a respective groove, to connect the groove in fluid communication with the respective hollow interior space. Each access hole has an exit diameter D that exceeds the opening width d of the top of the respective groove, where the diameter D is an effective diameter based on the area enclosed. The component further includes at least one coating disposed over at least a portion of the surface of the substrate, where the groove(s) and the coating together define one or more re-entrant shaped channels for cooling the component.

Another aspect of the present invention resides in a manufacturing method that includes forming one or more grooves in a component comprising a substrate, where the substrate has at least one hollow interior space. Each groove extends at least partially along the substrate and has a base and a top. The manufacturing method further includes forming at least one access hole through the base of a respective groove, to connect the groove in fluid communication with the respective hollow interior space. Each access hole has an exit diameter D that exceeds the opening width d of the top of the respective groove, where the diameter D is an effective diameter based on the area enclosed.

Yet another aspect of the invention resides in a manufacturing method that includes forming a groove in a component comprising a substrate, where the substrate has at least one hollow interior space. The groove extends at least partially along the substrate and has a base and a top. The manufacturing method further includes forming at least one access hole through the base of the groove, to connect the groove in fluid communication with the respective hollow interior space. The groove and the access hole(s) are machined as a single continuous process, such that the groove and the access hole(s) form a continuous cooling passage.

DRAWINGS

These and other features, aspects, and advantages of the present invention will become better understood when the following detailed description is read with reference to the accompanying drawings in which like characters represent like parts throughout the drawings, wherein.

Figure 10:
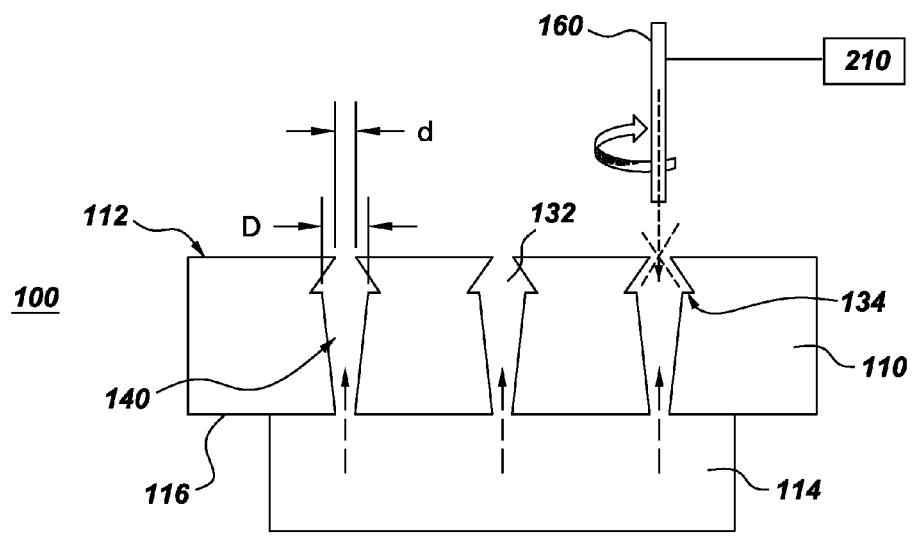
Figure 11:
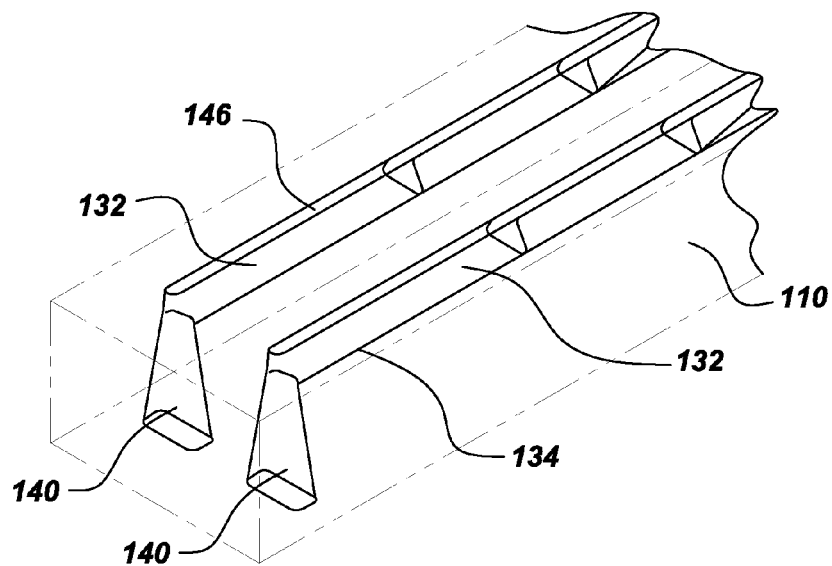
Figure 12:
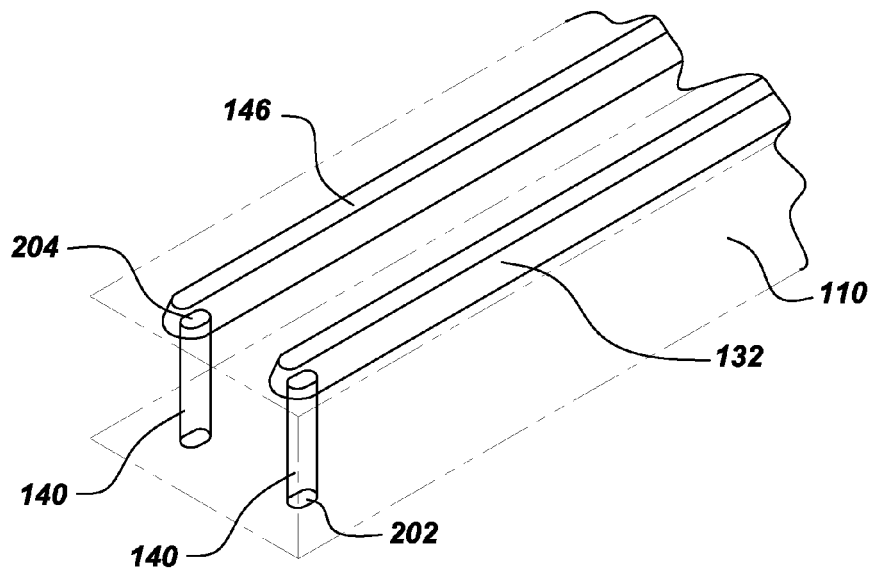
Figure 13:
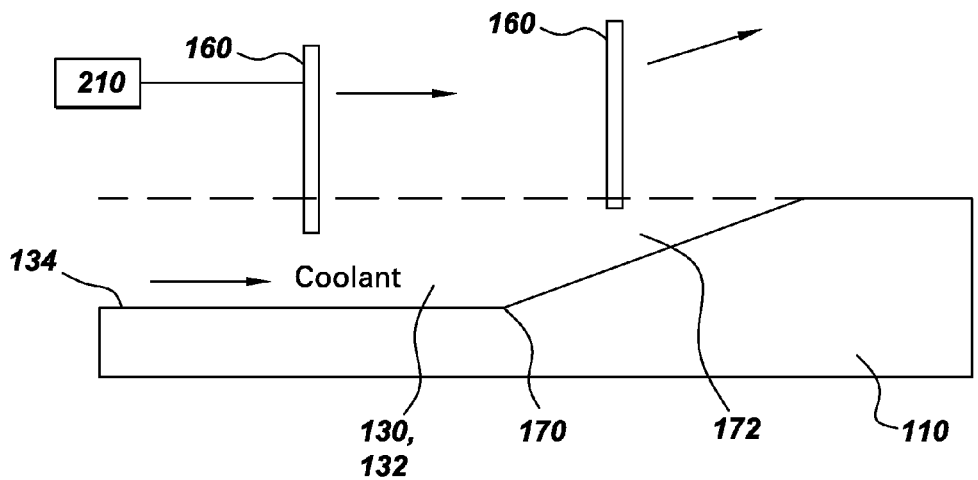
Figure 14:
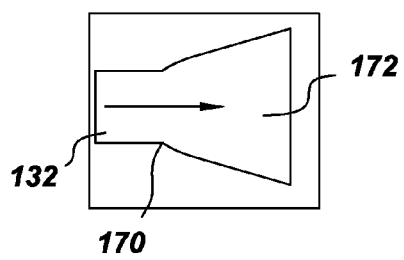
Figure 15:
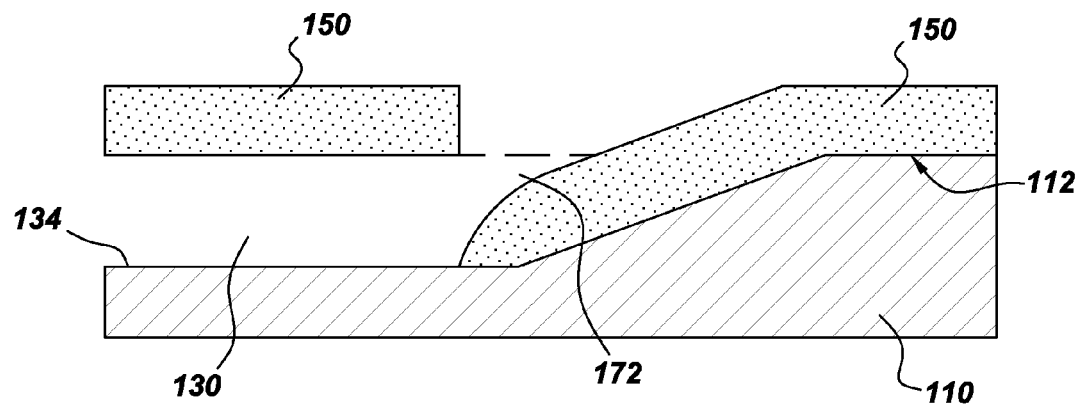
Figure 16:
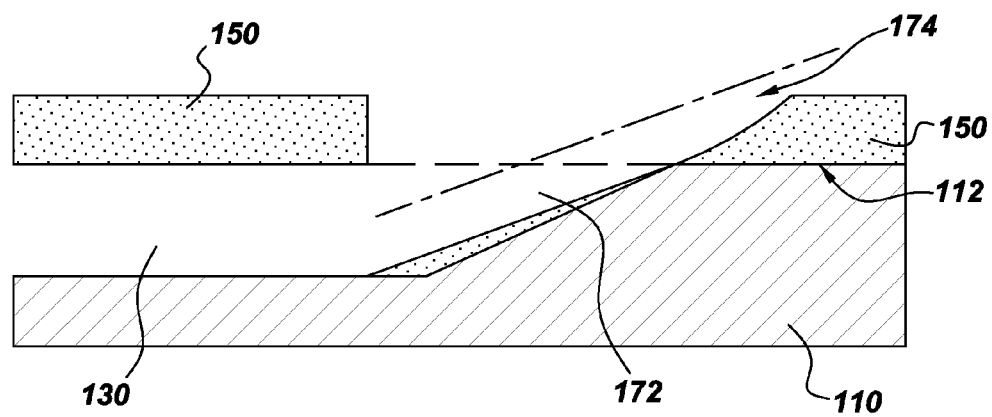

FIG. 10 schematically illustrates a machining operation for forming an access hole in a substrate;

FIG. 11 illustrates an example programmed routine for sweeping a cooling channel and associated access hole in a single machining operation;

FIG. 12 illustrates another example programmed routine for sweeping a cooling channel and associated access hole in a single machining operation;

FIG. 13 schematically depicts an example tooling path for forming a groove and a tapered, run-out region at the discharge end of the groove;

FIG. 14 is a top view of an example diffuser-shaped run-out region, which is wider than the respective groove;

FIG. 15 shows the example cooling channels of FIG. 13 with a coating applied; and FIG. 16 shows the example cooling channel of FIG. 15 with a film hole formed in the run-out region by removal of a portion of the coating in the run-out region.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
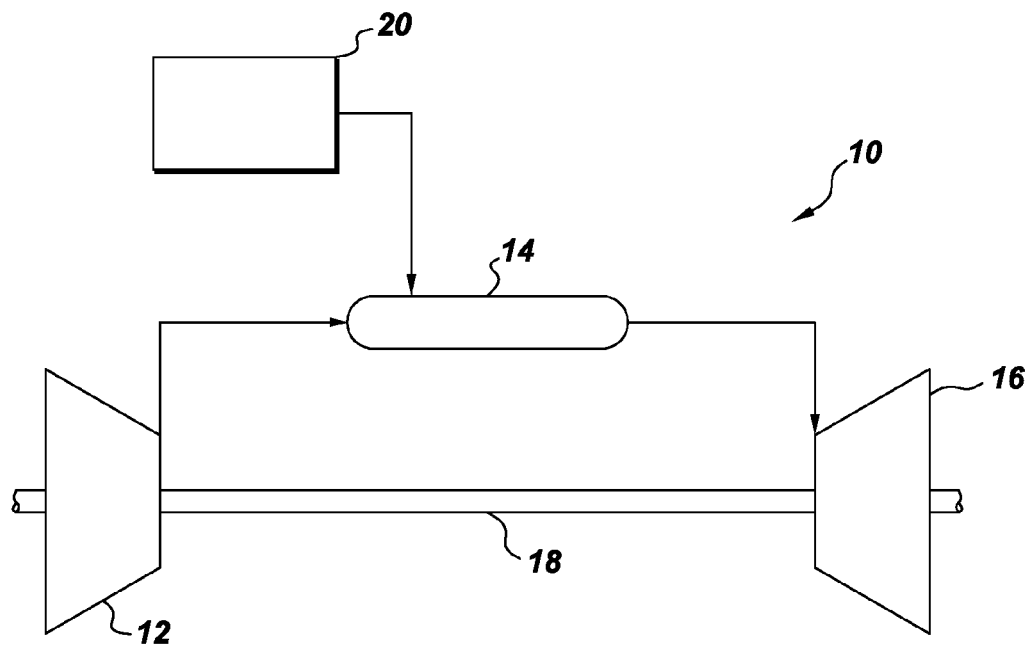
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present invention is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow 80, the hot gas path component 100 is heated by the hot gas flow 80 and may reach a temperature at which the hot gas path component 100 fails. Thus, in order to allow system 10 to operate with hot gas flow 80 at a high temperature, increasing the efficiency and performance of the system 10, a cooling system for the hot gas path component 100 is required.

In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.15 mm to 0.5 mm. The hot gas path component may be provided with a cover layer. A cooling fluid may be provided to the channels from a plenum, and the cooling fluid may flow through the channels, cooling the cover layer.

A manufacturing method is described with reference to FIGS. 2-10 and 13. As indicated for example in FIG. 10, the manufacturing method includes forming one or more grooves 132 in a component 100 comprising a substrate 110 (a portion of which is shown, for example, in FIGS. 3-5). As indicated, for example, in FIG. 2, the substrate 110 has at least one hollow interior space 114. As shown, for example, in FIGS. 8 and 13, each groove 132 extends at least partially along the substrate 110 and has a base 134 and a top 136.

Figure 3:
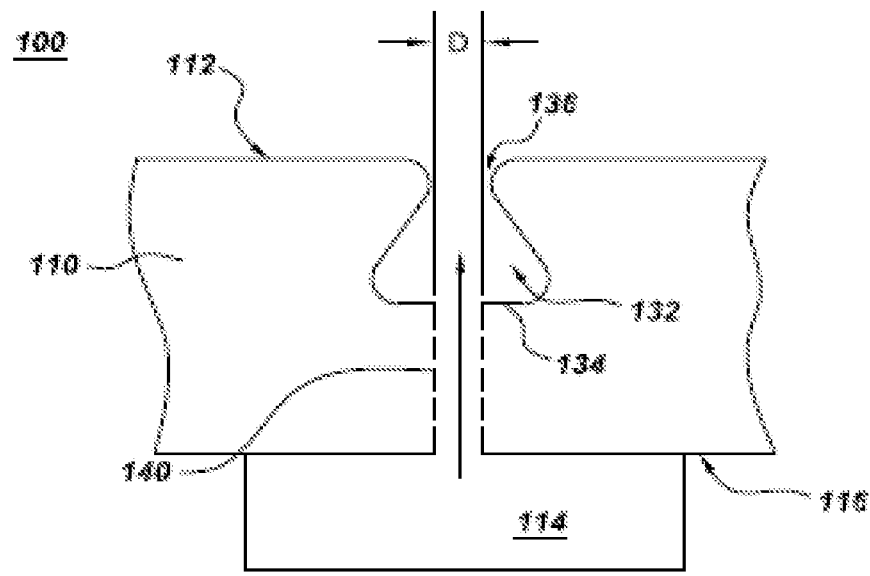
FIG. 3 is a schematic cross-section of a re-entrant shaped channel with an access hole of constant diameter D.

For the illustrated examples, the base 134 is wider than the top 136, such that each groove 132 comprises a re-entrant shaped groove 132, as indicated, for example, in FIG. 3. However, the grooves may have other shapes, for example, they may be simple grooves for other configurations. Re-entrant-shaped grooves are discussed in commonly assigned, U.S. patent application Ser. No. 12/943,624, R. Bunker et al., "Components with re-entrant shaped cooling channels and methods of manufacture," which is incorporated herein in its entirety. Although the grooves are shown as having straight walls, the grooves 132 can have any configuration, for example, they may be straight, curved, or have multiple curves.

The substrate 110 is typically cast prior to forming the groove(s) 132. As discussed in U.S. Pat. No. 5,626,462, Melvin R. Jackson et al., "Double-wall airfoil," which is incorporated herein in its entirety, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom per cent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and $Mo_3Si$ second phases. For other configurations, the substrate material comprises a ceramic matrix composite, such as a silicon carbide (SiC) matrix reinforced with SiC fibers. For other configurations the substrate material comprises a TiAl-based intermetallic compound.

For the example process shown in FIG. 10, the manufacturing method further includes forming at least one access hole 140 through the base 134 of a respective groove 132, to connect the groove 132 in fluid communication with the respective hollow interior space 114. For the example configurations shown in FIGS. 4-7, each access hole 140 has an exit diameter D that exceeds the opening width d of the top 136 of the respective groove 132. The diameter D is an effective diameter based on the area enclosed. Beneficially, the manufacturing method allows the formation of a larger sized access hole through an existing restricted entry surface. This is particularly advantageous for the case of re-entrant shaped channels, in that when a hole is to be drilled through a wall after a re-entrant shaped channel has been machined, or during the machining of the re-entrant shaped channel, there is a further limitation due to the minimum top opening size of the channel. Thus, a hole of say 30-mils in diameter may be drilled through the remaining wall thickness in the bottom of a re-entrant shaped channel whose upper opening size is much less than 30 mils. This relieves the issue of minimum hole sizes associated with debris plugging of cooled components in gas turbines.

The grooves 132 and access holes 140 may be formed using a variety of techniques. Example techniques for forming the groove(s) 132 include abrasive liquid jet, plunge electrochemical machining (ECM), electric discharge machining (EDM) with a spinning electrode (milling EDM), and laser machining. Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety.

Similarly, example techniques for forming the access hole(s) 140 include using one or more of an abrasive liquid jet, electric discharge machining (EDM) with a spinning electrode (milling EDM), and percussive (pulsed) laser machining. For example, abrasive liquid jet, laser, or milling EDM may be used with the pivot point of the "tool" being located in the throat of the upper minimum restriction region. Beneficially, any of these machining types can remove selected material in packages of limited depth, thereby allowing motion control to define the interior hole shaping in three-dimensional space while retaining the pivot point fixed.

Figure 6:
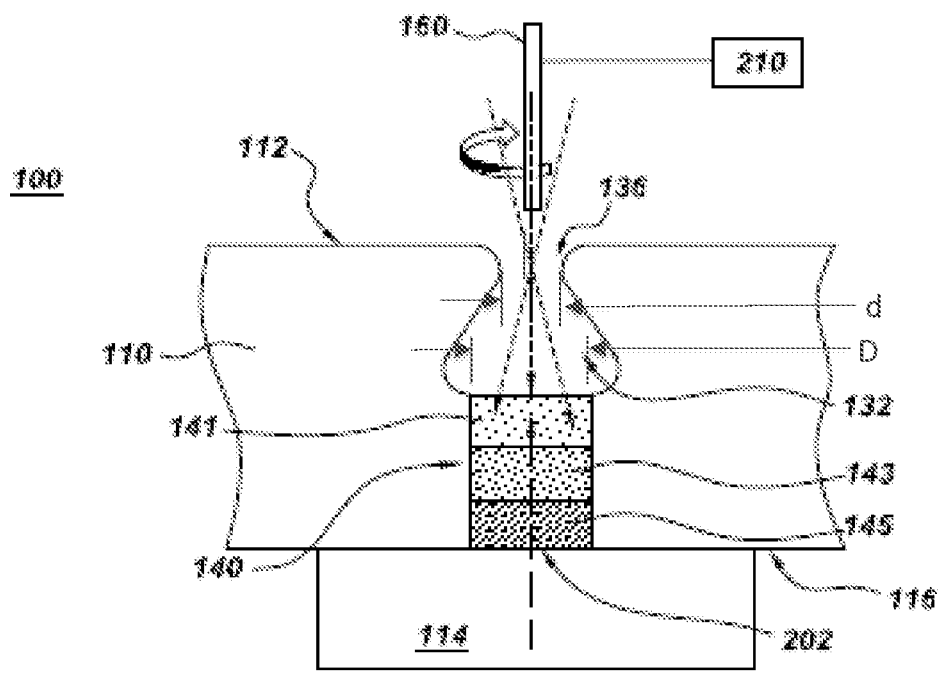
FIG. 6 illustrates a method for forming an access hole by performing multiple passes of an abrasive liquid jet, in accordance with aspects of the present invention.
Figure 7:
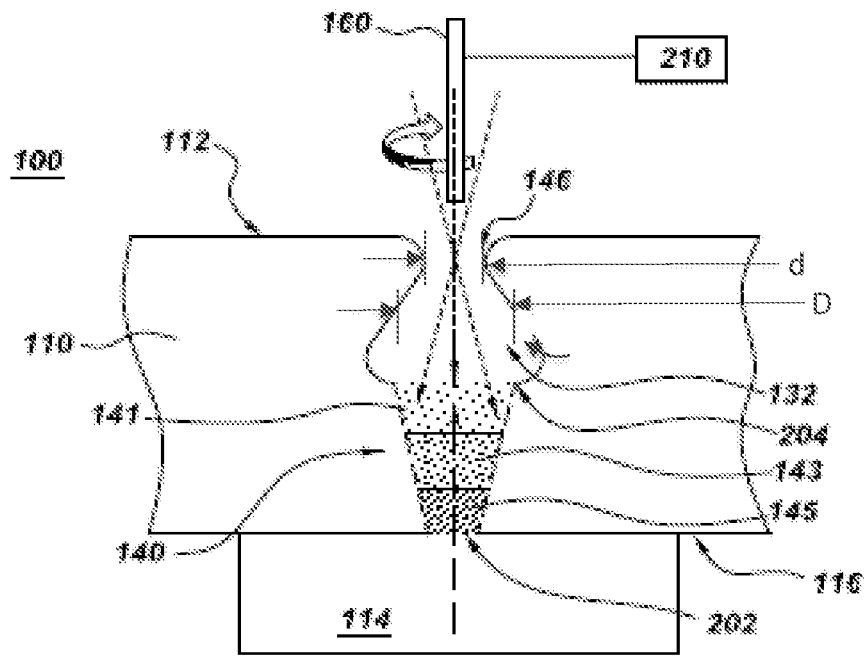
FIG. 7 illustrates a method for forming a diverging access hole by performing multiple passes of an abrasive liquid jet, in accordance with aspects of the present invention.

For the example processes illustrated in FIGS. 6 and 7, each access hole 140 is formed by applying multiple passes 141, 143, 145 of the abrasive liquid jet 160. It should be noted that the use of three passes is merely one example and other numbers of passes may be used. Example water jet drilling processes and systems are provided in commonly assigned U.S. patent application Ser. No. 12/790,675, "Articles which include chevron film cooling holes, and related processes," filed May 28, 2010, which is incorporated by reference herein in its entirety. As explained in U.S. patent application Ser. No. 12/790,675, the water jet process typically utilizes a high-velocity stream of abrasive particles (e.g., abrasive "grit"), suspended in a stream of high pressure water. The pressure of the water may vary considerably, but is often in the range of about 35-620 MPa. A number of abrasive materials can be used, such as garnet, aluminum oxide, silicon carbide, and glass beads. Beneficially, the capability of abrasive liquid jet machining techniques facilitates the removal of material in stages to varying depths, with control of the shaping. This allows the interior hole feeding the channel to be drilled either as a straight hole of constant cross section, a shaped hole (elliptic etc.), or a converging or diverging hole as shown.

In addition, and as explained in U.S. patent application Ser. No. 12/790,675, the water jet system can include a multi-axis computer numerically controlled (CNC) unit 210 (FIG. 10). The CNC systems themselves are known in the art, and described, for example, in U.S. Patent Publication 1005/0013926 (S. Rutkowski et al), which is incorporated herein by reference. CNC systems allow movement of the cutting tool along a number of X, Y, and Z axes, as well as rotational axes.

For the example process shown in FIG. 7, successively less material is removed from the substrate 110 in each subsequent pass, such that the access hole 140 comprises a diverging access hole 140. Namely, the access hole 140 in FIG. 7 diverges along the direction of the coolant flow from a smaller entry 202 to a larger exit 204. To form the converging access hole 140 shown in FIG. 5, successively more material is removed from the substrate 110 as the depth of the access hole increases (that is, in each subsequent pass), such that the access hole 140 comprises a converging access hole 140. Namely, the access hole 140 in FIG. 5 converges along the direction of the coolant flow from a larger entry 202 to a smaller exit 204.

Figure 8:
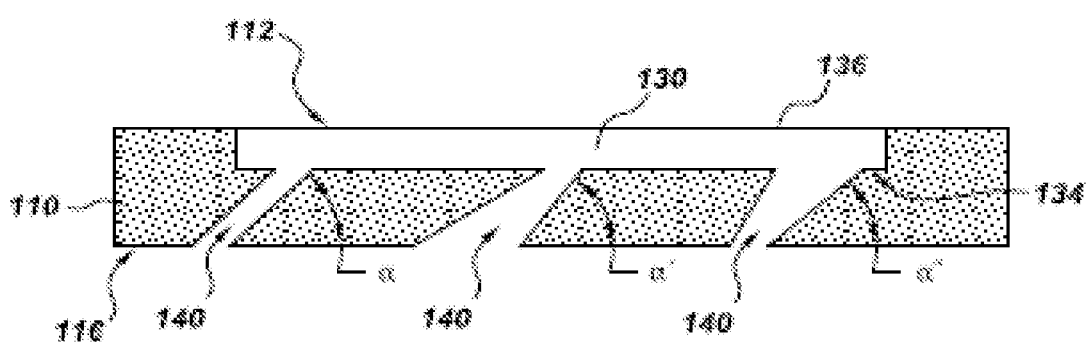
FIG. 8 illustrates, in cross-sectional view, three different shapes for access holes for a cooling channel.

For the example process shown in FIG. 6, each access hole 140 is formed by applying multiple passes 141, 143, 145 of the abrasive liquid jet 160 to remove an essentially constant amount material from the substrate 110 at all depths of the access hole, such that the access hole 140 comprises a straight access hole 140 (that is, it does not diverge or converge). Namely, the amount of material removed at any given point along the access hole 140 differs by less than ten percent of its value relative to the amount of material removed at any other point along the access hole 140. Again, the use of three passes in FIG. 6 is merely illustrative, and other numbers of passes may be employed. Further, the access hole may be of nominally constant effective diameter, but also of differing diameter and shape at various sections. As indicated in FIGS. 3-7, the access hole may be formed orthogonal to base 134 of the groove 132. For other arrangements, the access hole may be formed at an angle α relative to the base 134 of the groove 132, as illustrated for example in FIG. 8. It should be noted that the angle α may be oriented in any direction relative to the base 134 of the groove 132. In addition, the access hole may be machined at an angle, and still include the various shaping noted. For example, diverging, straight and converging access holes may be angled relative to the base 134 of the groove 132, as indicated in FIG. 8.

As noted above, abrasive liquid jet is not the only approach that can be used to form access holes with the desired shaping and orientation. For example, a percussion laser drilling process also removes material in small amounts, such that motioning the laser while maintaining the pivot point in the narrow portion of the channel top opening will allow similar access hole shaping. Similarly, milling EDM may be employed to form access holes with the desired shaping and orientation, provided the tool head is smaller than the top channel opening size.

Figure 2:
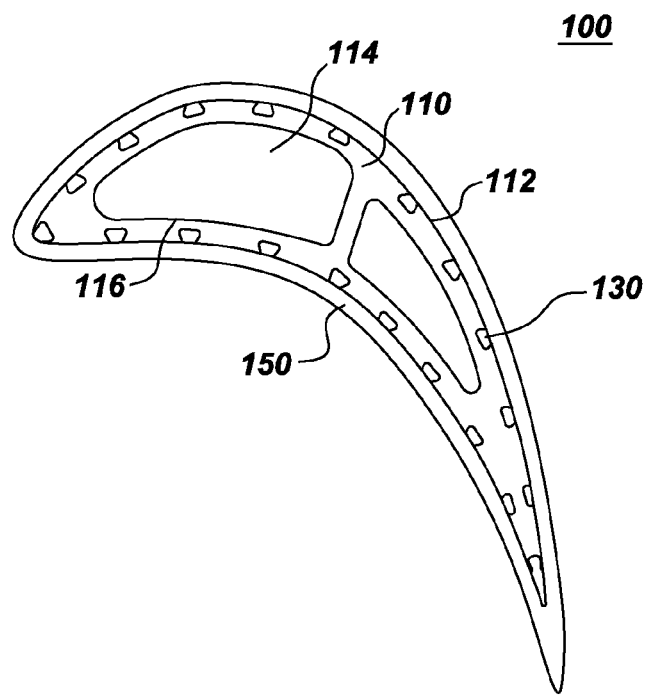
FIG. 2 is a schematic cross-section of an example airfoil configuration with re-entrant shaped cooling channels, in accordance with aspects of the present invention.
Figure 9:
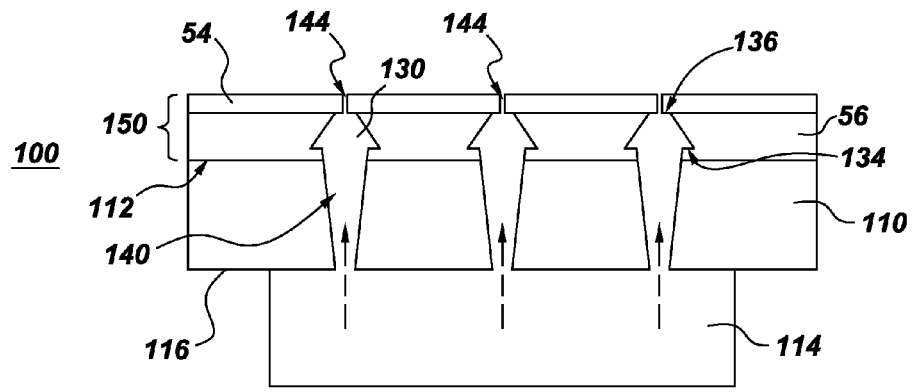
FIG. 9 is a schematic cross-section of three example re-entrant shaped channels with divergent access holes and permeable slots formed in a structural coating.

For the example configurations shown in FIGS. 2 and 9, the manufacturing method further includes disposing a coating 150 over at least a portion of the surface 112 of the substrate 110. As indicated in FIGS. 2 and 9, the groove(s) 132 and the coating 150 define one or more channels 130 for cooling the component 100. Coating 150 comprises a suitable material and is bonded to the component. For the illustrated examples, the channels 130 are re-entrant shaped channels.

For particular configurations, the coating 150 has a thickness in the range of 0.1-2.0 millimeters, and more particularly, in the range of 0.1 to 1 millimeter, and still more particularly 0.1 to 0.5 millimeters for industrial components. For aviation components, this range is typically 0.1 to 0.25 millimeters. However, other thicknesses may be utilized depending on the requirements for a particular component 100.

The coating 150 comprises structural coating layers and may further include optional additional coating layer(s). The coating layer(s) may be deposited using a variety of techniques. For particular processes, the structural coating layer(s) are deposited by performing an ion plasma deposition (cathodic arc). Example ion plasma deposition apparatus and method are provided in commonly assigned, US Published Patent Application No. 10080138529, Weaver et al, "Method and apparatus for cathodic arc ion plasma deposition," which is incorporated by reference herein in its entirety. Briefly, ion plasma deposition comprises placing a cathode formed of a coating material into a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a coating deposited using ion plasma deposition include structural coatings, as well as bond coatings and oxidation-resistant coatings, as discussed in greater detail below with reference to U.S. Pat. No. 5,626,462, Jackson et al., "Double-wall airfoil." For certain hot gas path components 100, the structural coating comprises a nickel-based or cobalt-based alloy, and more particularly comprises a superalloy or a (NiCo)CrAlY alloy. For example, where the substrate material is a Ni-base superalloy containing both γ and γ' phases, structural coating may comprise similar compositions of materials, as discussed in greater detail below with reference to U.S. Pat. No. 5,626,462.

For other process configurations, a structural coating is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a NiCrAlY coating is deposited by HVOF or HVAF. Other example techniques for depositing the structural coating include, without limitation, sputtering, electron beam physical vapor deposition, electroless plating, and electroplating.

For certain configurations, it is desirable to employ multiple deposition techniques for depositing structural and optional additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

For the example process illustrated by FIG. 9, the coating 150 comprises an outer layer 56 of a structural coating, and the manufacturing method further includes depositing an inner layer 54 of the structural coating on the outer surface 112 of the substrate 110 prior to forming the groove(s) 132 and the one or more access holes 140. As indicated in FIG. 9, each groove 132 is formed at least partially in the inner structural coating 54. Although the grooves shown in FIG. 9 do not extend into the substrate 110, for other configurations the grooves extend through the inner layer 54 of the structural coating and extend into the substrate 110. However, for many configurations, the grooves 132 are formed entirely in the substrate 110 (FIGS. 3-8, 10-13, 15 and 16), and the coating layers are deposited after the grooves 132 have been formed.

Beneficially, the above described manufacturing method allows the formation of a larger sized access hole through an existing restricted entry surface, thereby relieving the issue of minimum hole sizes associated with debris plugging of cooled components in gas turbines. Commercially this technique can be valuable, not only in the fabrication of microchannel cooled parts, but also in other components requiring such internal holes without the need for machining access from the interior of the components.

A component 100 is described with reference to FIGS. 2-9, 15 and 16. As indicated, for example, in FIG. 2, the component 100 includes a substrate 110 comprising an outer surface 112 and an inner surface 116. As indicated, for example, in FIG. 2, the inner surface 116 defines at least one hollow, interior space 114. As indicated, for example in FIGS. 2 and 4, the component 100 defines one or more grooves 132. As indicated, for example in FIGS. 15 and 16, each groove 132 extends at least partially along the substrate 110 and, as shown in FIG. 4, for example, has a base 134 and a top 136.

Figure 4:
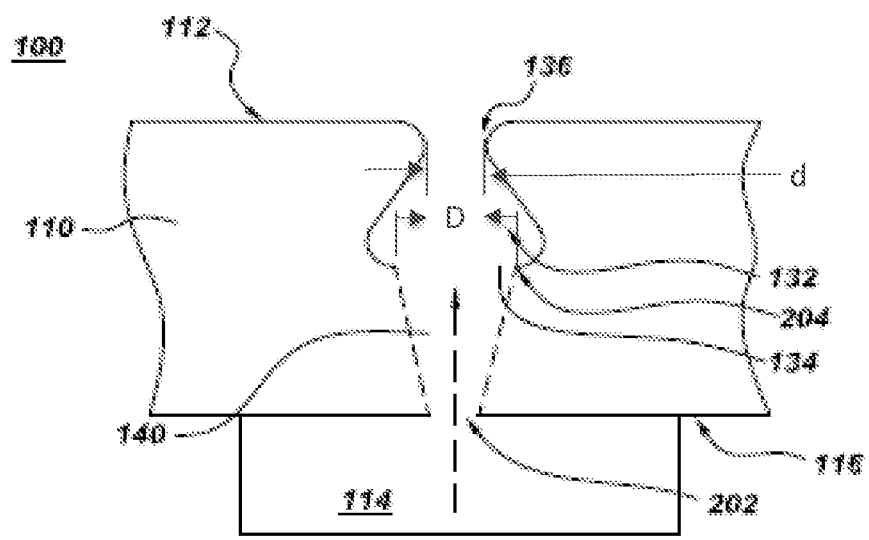
FIG. 4 is a schematic cross-section of a re-entrant shaped channel with a divergent access hole, in accordance with aspects of the present invention.

For the illustrated examples, the base 134 is wider than the top 136, as indicated, for example in FIG. 4, such that each groove 132 comprises a re-entrant shaped groove 132. As noted above, re-entrant shaped grooves are described in U.S. patent application Ser. No. 12/943,624. For particular configurations, the base 134 of each re-entrant shaped groove 132 is at least two times wider than the top 136 of the respective groove 132. For more particular arrangements, the base 134 is in a range of about 3-4 times wider than the top 136 of the respective groove 132. Example re-entrant shaped grooves 132 are shown in FIGS. 3-7.

As indicated, for example, in FIGS. 4-7, one or more access holes 140 are formed through the base 134 of a respective groove 132, to connect the groove 132 in fluid communication with the respective hollow interior space 114. Each access hole has an exit diameter D that exceeds the opening width d of the top 136 of the respective groove 132, where the diameter D is an effective diameter based on the area enclosed. The access holes 140 may be orthogonal to the base 134 of the groove 132, as shown, for example, in FIGS. 3-7. For other configurations, the access holes 140 may be angled relative to the base 134 of the groove 132, as indicated, for example, in FIG. 8. As noted above, the formation of larger sized access holes through the smaller size channel tops, relieves the issue of minimum hole sizes associated with debris plugging of cooled components in gas turbines.

As indicated, for example, in FIG. 2, the component 100 further includes at least one coating 150 disposed over at least a portion of the surface 112 of the substrate 110. The groove(s) 132 and the coating 150 together define one or more re-entrant shaped channels 130 for cooling the component 100. Suitable coatings are described above.

For the configurations shown in FIGS. 3-8, the grooves 132 are formed in the substrate. For other configurations, the grooves 132 may be formed at least partially in an inner structural layer 54. U.S. patent application, Ser. No. 12/966,101, Ronald S. Bunker et al., "Method of fabricating a component using a two-layer structural coating," which is incorporated herein in its entirety, describes the formation of grooves in an inner structural layer. For the arrangement shown in FIG. 9, the coating 150 comprises an inner structural coating layer 54 disposed on the outer surface 112 of the substrate 110 and an outer structural coating layer 56 disposed on the inner structural coating layer 54, where each groove 132 is formed at least partially in the inner structural coating layer (54). For the arrangement shown in FIG. 9, the grooves 132 are formed entirely in the inner structural coating layer 54. However, for other arrangements (not shown), the grooves may extend through the inner structural coating layer 54 into the substrate 110.

For the example configuration shown in FIG. 4, the entry 202 (that is, the entry into the access hole for the coolant flow from the hollow, interior space 114) of the access hole 140 is smaller than the exit 204 (that is the exit for the coolant flow from the access hole into the groove 132) of the respective access hole 140, such that the access hole 140 comprises a divergent access hole 140. Namely, the access hole 140 in FIG. 4 diverges along the direction of the coolant flow from a smaller entry 202 to a larger exit 204. For particular configurations, the exit 204 diameter for a respective access hole 140 is at least 1.5 times larger than an entrance 202 diameter for the respective access hole 140. For more particular arrangements, the exit 204 diameter is at least two times larger than the entrance 202 diameter for the respective access hole. The diverging access hole may be oriented orthogonal to the base 134 of the groove 132, as shown in FIGS. 4 and 7, for example. Alternatively, the diverging access hole 140 may be oriented at an angle α" relative to the base 134 of the groove 132, as shown in FIG. 8 for example. As noted above, the angle α may be oriented in any direction relative to the base 134 of the groove 132.

For the configuration shown in FIG. 6, the cross-sectional area of the access hole 140 is essentially the same throughout the access hole 140, such that the access hole neither diverges nor converges. As used here, by "essentially the same," it is meant that the cross-sectional area at any given point along the access hole 140 differs by less than 10% of its value relative to the cross-sectional area at any other point along the access hole 140. For this essentially constant cross-sectional area configuration, the access hole may be oriented orthogonal to the base 134 of the groove 132, as shown in FIG. 6. Alternatively, the access hole 140 may be oriented at an angle α (in any direction) relative to the base 134 of the groove 132, as shown in FIG. 8, for example. For still other configurations, the access hole may be converging (namely, the access hole 140 in FIG. 5 converges along the direction of the coolant flow from a larger entry 202 to a smaller exit 204), as shown in FIG. 5, and may be oriented orthogonal to the base 134 of the groove 132, as shown in FIG. 5 or at an angle α' relative to the base 134 of the groove 132, as shown in FIG. 8.

The access holes 140 may have a variety of shapes. Each access hole 140 has an entry 202 adjacent to the respective hollow interior space 114 and exit 204 adjacent to the respective groove 132. For the example configuration shown in FIG. 12, at least one of the entry 202 and exit 204 for each access hole 140 has a race-track shape. More particularly, for the example arrangement shown in FIG. 12, the minor axis of the racetrack shaped access holes 140 is smaller than the top 146 of the cooling channels 132.

Figure 5:
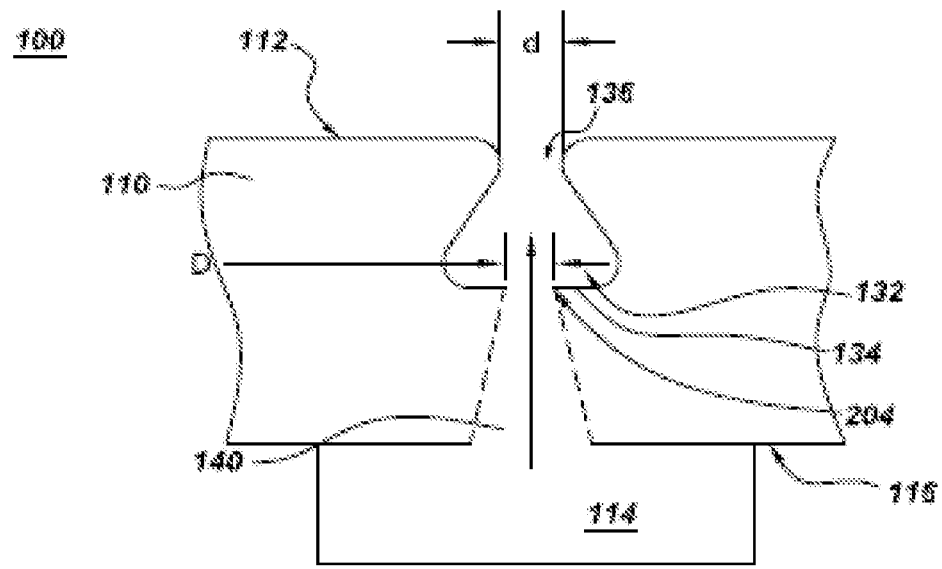
FIG. 5 is a schematic cross-section of a re-entrant shaped channel with a convergent access hole, in accordance with aspects of the present invention.

For the example configuration shown in FIG. 5, the entry 202 for the access hole 140 is larger than the exit 204 of the access hole 140, such that the access hole 140 comprises a convergent access hole 140. Namely, the access hole 140 in FIG. 5 converges along the direction of the coolant flow from a larger entry 202 to a smaller exit 204. The convergent access hole may be oriented orthogonal to the base 134 of the groove 132, as shown in FIG. 5. Alternatively, the convergent access hole 140 may be oriented at an angle α' (in any direction) relative to the base 134 of the groove 132, as shown in FIG. 8, for example.

Beneficially, the above described component employs larger sized access holes relative to the smaller size channel openings (tops 146). As noted above, this is particularly advantageous for the case of re-entrant shaped channels, which have relatively small width top openings. Thus, an access hole with an effective diameter D may be formed in a re-entrant shaped channel whose upper opening width d is much less than D. These larger diameter access holes help to reduce debris plugging of cooled components in gas turbines.

Another manufacturing method is described with reference to FIGS. 3-8 and 10-16. As indicated for example in FIG. 10, the manufacturing method includes forming a groove 132 in a component 100 comprising a substrate 110. The substrate 110 has at least one hollow interior space 114, and the groove 132 extends at least partially along the substrate 110 and has a base 134 and a top 136. The manufacturing method further includes forming at least one access hole 140 through the base 134 of the groove 132, to connect the groove 132 in fluid communication with the respective hollow interior space 114. For this process, the groove 132 and the access hole(s) 140 are machined as a single continuous process, such that the groove 132 and the access hole(s) 140 form a continuous cooling passage 132, 140, as indicated, for example, in FIGS. 11 and 12. As used here, a continuous process is one that uses the same programmed motion control to machine the groove and the respective access hole(s). A continuous machining process may include one or more pauses of the machining tool. For the avoidance of doubt, it should be noted that machining the groove first and then the hole using the same programmed machine control should be understood to be a continuous process.

For the arrangements illustrated in FIGS. 11 and 12, the steps of forming the groove 132 and of forming the respective access hole(s) 140 are repeated one or more times, such that multiple grooves 132 and respective access holes 140 are formed. Each groove 132 and the respective access hole(s) 140 are machined as a single continuous process, such that the respective groove 132 and access hole(s) (140) form a continuous cooling passage 132, 140. Beneficially, forming each groove and the respective access hole(s) as a single continuous process, removes undesirable discontinuities and start-stops, thereby reducing material flaws and/or dimensional changes in the resulting groove and access hole(s).

For the example arrangements shown in FIGS. 11 and 12, the base 134 is wider than the top 136 of the groove 132, such that the groove 132 comprises a re-entrant shaped groove 132. As noted above, re-entrant shaped grooves are described in U.S. patent application Ser. No. 12/943,624. In addition, for the example arrangement shown in FIG. 11, each access hole 140 has an exit diameter D that exceeds the opening width d of the top 136 of the respective groove 132, where the diameter D is an effective diameter based on the area enclosed.

The manufacturing method typically further includes casting the substrate 110 prior to forming the groove 132. Example techniques for forming the groove 132 include using one or more of an abrasive liquid jet, plunge electrochemical machining (ECM), electric discharge machining (EDM) with a spinning electrode (milling EDM), and laser machining. Similarly, example techniques for forming the access hole(s) 140 include using one or more of an abrasive liquid jet, electric discharge machining (EDM) with a spinning electrode (milling EDM), and percussive (pulsed) laser machining. For the process illustrated by FIG. 10, the step of forming the groove 132 includes using a multi-axis motion controller 210 to control the application of multiple passes of an abrasive liquid jet 160 to remove material from the component 100 in each of the passes, and the step of forming the access hole(s) 140 also includes using the multi-axis motion controller 210 to change the speed of the abrasive liquid jet 160 at a selected point in the groove 132 and to control the application of multiple passes 141, 143, 145 (FIGS. 6 and 7) of the abrasive liquid jet 160 to remove material from the component 100 in each of the passes. As noted above, multi-axis CNC systems themselves are known in the art, and described, for example, in U.S. Patent Publication 1005/0013926, S. Rutkowski et al. Multi-axis CNC systems allow movement of the cutting tool along a number of X, Y, and Z axes, as well as rotational axes.

More particularly, the abrasive liquid jet forms a simple channel of finite and controlled depth and width (and shape) by programmed machining in multiple passes, eg. back and forth along the length, to remove a certain amount of material in each pass. The power density of the jet, as well as its diameter and offset distance, determine how much material is removed per centimeter of motion. The motion control determines the shaping. Now instead of stopping and repositioning the jet to drill a cooling supply hole, as would be current conventional practice, the motion control slows the device down at the desired point and may also pivot, or tilt, or dwell, to remove a portion of the hole in each pass. The same can be done at the channel exit end. As a total process, the complete channel, inlet, and exit are formed by a continuous motion and parameter control in a series of passes that controls material removal in each area.

As indicated, for example, in FIGS. 13 and 14, the groove 132 has at least one discharge point 170. For the example process shown in FIG. 13, the manufacturing method further includes forming a run-out region 172 adjacent to the respective discharge point 170 for each groove 132. Beneficially, the groove 132 and the run-out region 172 are machined as a single continuous process, such that the groove 132 and the run-out region 172 form a continuous cooling passage 132, 172. Run-out regions 172 are discussed in commonly assigned, U.S. patent application Ser. No. 13/026,595, Ronald S. Bunker, "Components with cooling channels and methods of manufacture," which is hereby incorporated herein in its entirety.

For the particular process illustrated in FIG. 13, the step of forming the run-out region 172 includes using the multi-axis motion controller 210 to control application of one or more passes of the abrasive liquid jet 160 to remove material from the component 100 in each pass. For the example shown in FIG. 13, the run-out region 172 is formed by lifting the abrasive liquid jet 160 from the outer surface (112) of the substrate 110, such that the run-out region 172 is tapered. For the example configuration shown in FIG. 14, the run-out region 172 is wider than the groove 132. More particularly, FIG. 14 is a top view of an example diffuser-shaped run-out region, which is wider than the respective groove. Instead of stopping and repositioning the abrasive liquid jet to form the channel end, as would be current conventional practice, the motion control slows the device down at the desired point and may also pivot, or tilt, or dwell, to remove a portion of the channel end in each pass. Thus, as noted above, the complete channel, inlet, and exit are formed by a continuous motion and parameter control in a series of passes that controls material removal in each area.

As shown in FIG. 15, the manufacturing method may further include disposing a coating 150 over at least a portion of the surface 112 of the substrate 110. As indicated in FIG. 15, the groove 132 and the coating 150 define a channel 130 for cooling the component 100. FIG. 16 shows the example cooling channel of FIG. 15 after removal of a portion of the coating in the run-out region. For the arrangements shown in FIGS. 15 and 16, the coating 150 does not bridge the run-out region 172, such that the run-out region 172 forms a film hole 174 for the groove 132.

For the configurations shown in FIGS. 3-8, the grooves 132 are formed in the substrate. For other configurations, the grooves 132 may be formed at least partially in an inner structural layer 54, as shown in FIG. 9, for example. To form these arrangements, the coating 150 comprises an outer layer of a structural coating, and the method further includes depositing an inner layer of the structural coating 54 on the outer surface 112 of the substrate 110 prior to forming the groove 132 and the access hole(s) 140, where the groove 132 is formed at least partially in the inner structural coating 54. As noted above, U.S. patent application Ser. No. 12/966,101, Ronald S. Bunker et al., "Method of fabricating a component using a two-layer structural coating," describes the formation of grooves in an inner structural layer. However, using the present technique, the groove 132 and the access hole(s) 140 are machined as a single continuous process, such that the groove 132 and the access hole(s) 140 form a continuous cooling passage 132, 140, as indicated, for example, in FIGS. 11 and 12.

Beneficially, the above-described manufacturing method enables the machining of complete and integral cooling channels, including the coolant inlet access holes and the exit regions, in the surface of a component such as a turbine airfoil, through a continuous programmed machine motion.

By machining the channel and access holes as one continuous process, without resetting, stopping, or re-starting the machining, a continuous unbroken cooling passage is formed with no discontinuities. This provides shorter machining times, better repeatability, and avoidance of potential flaws or out-of-spec results.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A manufacturing method comprising:
   forming one or more grooves in a component comprising a substrate, wherein the substrate has at least one hollow interior space, wherein each groove extends at least partially along the substrate and has a base and a top; and
   forming at least one discrete access hole through the base of a respective groove, to connect the groove in fluid communication with the respective hollow interior space, wherein each access hole has an exit diameter D that exceeds an opening width d of the top of the respective groove, wherein the diameter D is an effective diameter based on the area enclosed,
   wherein the step of forming the one or more grooves comprises using a multi-axis motion controller to control application of a plurality of passes of an abrasive liquid jet to remove material from the component in each of the passes, and
   wherein the step of forming the at least one access hole comprises using the multi-axis motion controller to change the speed of the abrasive liquid jet at a selected point in the groove and to control application of a plurality of passes of the abrasive liquid jet to remove material from the component in each of the passes.

2. The manufacturing method of claim 1, further comprising casting the substrate prior to forming the one or more grooves, wherein each groove is formed using the abrasive liquid jet, and one or more of plunge electrochemical machining (ECM), electric discharge machining with a spinning electrode (milling EDM), and laser machining.

3. The manufacturing method of claim 2, wherein each access hole is formed using the abrasive liquid jet, and one or more of electric discharge machining with a spinning electrode (milling EDM), and percussive (pulsed) laser machining.

4. The manufacturing method of claim 3, wherein each access hole is formed by applying a plurality of passes of the abrasive liquid jet, wherein successively less material is removed from the substrate, such that the access hole comprises a diverging access hole.

5. The manufacturing method of claim 3, wherein each access hole is formed by applying a plurality of passes of the abrasive liquid jet, wherein successively more material is removed from the substrate as the depth of the access hole increases, such that the access hole comprises a converging access hole.

6. The manufacturing method of claim 3, wherein each access hole is formed by applying a plurality of passes of the abrasive liquid jet to remove a substantially constant amount of material from the substrate at all depths of the access hole, such that the access hole comprises an essentially straight access hole.

7. The manufacturing method of claim 1, further comprising disposing a coating over at least a portion of the surface of the substrate, wherein the groove(s) and the coating define one or more channels for cooling the component.

8. The manufacturing method of claim 7, wherein the coating comprises an outer layer of a structural coating, the method further comprising depositing an inner layer of the structural coating on an outer surface of the substrate prior to forming the one or more grooves and the one or more access holes, wherein each groove is formed at least partially in the inner layer of structural coating.

9. The manufacturing method claim 1, wherein the base is wider than the top, such that each groove comprises a re-entrant shaped groove.

10. A manufacturing method comprising:
    forming a groove in a component comprising a substrate, wherein the substrate has at least one hollow interior space, wherein the groove extends at least partially along the substrate and has a base and a top; and
    forming at least one discrete access hole through the base of the groove, to connect the groove in fluid communication with the respective hollow interior space, wherein the groove and the access hole(s) are machined as a single continuous process, such that the groove and the access hole(s) form a continuous cooling passage,
    wherein the step of forming the groove comprises using a multi-axis motion controller to control application of a plurality of passes of an abrasive liquid jet to remove material from the component in each of the passes, and
    wherein the step of forming the at least one discrete access hole comprises using the multi-axis motion controller to change the speed of the abrasive liquid jet at a selected point in the groove and to control application of a plurality of passes of the abrasive liquid jet to remove material from the component in each of the passes.

11. The manufacturing method of claim 10, wherein the base is wider than the top of the groove, such that the groove comprises a re-entrant shaped groove.

12. The manufacturing method of claim 10, further comprising casting the substrate prior to forming the one or more grooves, wherein each groove is formed using the abrasive liquid jet, and one or more of plunge electrochemical machining (ECM), electric discharge machining with a spinning electrode (milling EDM), and laser machining.

13. The manufacturing method of claim 10, wherein each access hole is formed using the abrasive liquid jet, and one or more of electric discharge machining with a spinning electrode (milling EDM), and percussive (pulsed) laser machining.

14. The manufacturing method of claim 10, wherein the groove has at least one discharge point, the manufacturing method further comprising forming a run-out region adjacent to the respective discharge point for each groove, wherein the groove and the run-out region are machined as a single continuous process, such that the groove and the run-out region form a continuous cooling passage.

15. The manufacturing method of claim 14, wherein the step of forming the run-out region comprises using the multi-axis motion controller to control application of one or more passes of the abrasive liquid jet to remove material from the component in each pass.

16. The manufacturing method of claim 15, wherein the run-out region is formed by lifting the abrasive liquid jet from the outer surface of the substrate, such that the run-out region is tapered.

17. The manufacturing method of claim 14, further comprising disposing a coating over at least a portion of the surface of the substrate, wherein the groove and the coating define a channel for cooling the component.

18. The manufacturing method of claim 17, wherein the coating does not bridge the run-out region, such that the run-out region forms a film hole for the groove.

19. The manufacturing method of claim 17, wherein the coating comprises an outer layer of a structural coating, the method further comprising depositing an inner layer of the structural coating on an outer surface of the substrate prior to forming the groove and the one or more access holes, wherein the groove is formed at least partially in the inner layer of the structural coating.

20. The manufacturing method of claim 10, wherein the steps of forming the groove and of forming the respective access hole(s) are repeated one or more times, such that a plurality of grooves and respective access holes are formed, wherein each groove and the respective access hole(s) are machined as a single continuous process, such that the respective groove and access hole(s) form a continuous cooling passage.

21. The manufacturing method of claim 10, wherein each access hole has an exit diameter D that exceeds an opening width d of the top of the respective groove, wherein the diameter D is an effective diameter based on the area enclosed.

22. A manufacturing method comprising:
forming a groove in a component comprising a substrate, wherein the substrate has at least one hollow interior space, wherein the groove extends at least partially along the substrate and has a base and a top; and
forming at least one access hole through the base of the groove, to connect the groove in fluid communication with the respective hollow interior space, wherein the groove and the access hole(s) are machined as a single continuous process, such that the groove and the access hole(s) form a continuous cooling passage,
wherein the step of forming the groove comprises using a multi-axis motion controller to control application of a plurality of passes of an abrasive liquid jet to remove material from the component in each of the passes, and
wherein the step of forming the access hole(s) comprises using the multi-axis motion controller to change the speed of the abrasive liquid jet at a selected point in the groove and to control application of a plurality of passes of the abrasive liquid jet to remove material from the component in each of the passes.

* * * * *